United States Patent Office 3,139,513
Patented June 30, 1964

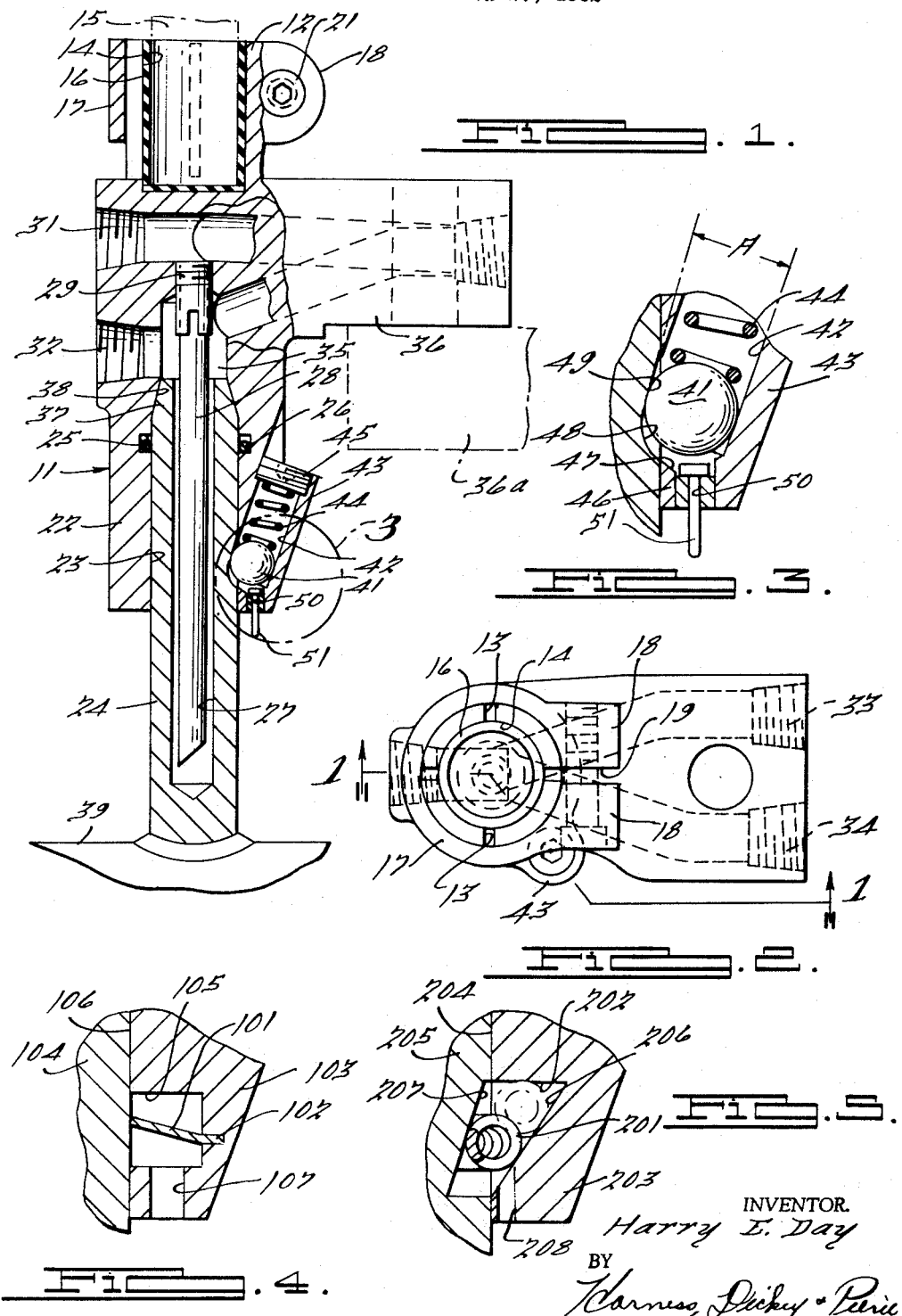

3,139,513
ELECTRODE HOLDER
Harry E. Day, 19335 Riverside Drive, Birmingham, Mich.
Filed Mar. 20, 1962, Ser. No. 181,081
8 Claims. (Cl. 219—120)

This invention relates to electrode holders, and more particularly to holders for electrodes used in spot welding and in which the electrode tip is pressed against the work by a force applied to the holder.

It is an object of the invention to provide a novel and improved electrode holder in which means are provided for pulling the electrode away from the work after the weld is completed despite sticking of the electrode tip to the work because of the applied heat, but which nevertheless permits the electrode to be removed from the holder with extreme ease for maintenance or replacement purposes.

It is another object to provide an improved electrode holder of this type which insures a high rate of current flow between the holder and electrode without detracting from the ease of removal of the electrode from the holder.

It is also an object to provide an improved electrode holder having the above characteristics, which may be combined with a coolant construction for the electrode.

It is another object to provide an improved electrode holder of this character which is of relatively simple and economical construction and is reliable in use.

Other objects, features, and advantages of the present invention will become apparent from the subsequent description, taken in conjunction with the accompanying drawings, in which:

FIGURE 1 is a cross-sectional view in elevation of a suitable embodiment of the invention, shown with an electrode in place and being held against the work, the view being taken along the line 1—1 of FIGURE 2;

FIG. 2 is a top plan view of the electrode holder;

FIG. 3 is a fragmentary cross-sectional view taken in the area marked 3 of FIGURE 1 and showing the relative angularities of the electrode recess and the detent guide passage;

FIG. 4 is a fragmentary cross-sectional view similar to FIGURE 3 and showing a modified form of detent in the form of a leaf spring, and FIG. 5 is a view similar to FIGURES 3 and 4 but showing a still further modification of the detent in the form of an annular helical spring.

In general terms, each of the illustrated embodiments of the invention comprises an electrode holder of the type having a recess at one end for receiving an electrode, the other end of the holder being securable to a welding gun or similar means for exerting an axial force on the electrode through the holder. In use, the electrode is pressed against the work, current is applied and then shut off, and the holder and electrode are then withdrawn from the work.

Since the electrode will tend to stick to the surface of the work because of the heat created between the parts, means must be provided for securing the electrode to the holder in such a way that withdrawal of the holder will pull the electrode with it. Conventional methods of securing the electrode holder have included the use of a split type of holder which could be clamped to the electrode. With this construction, it has been necessary to apply a tool such as a wrench to the holder to unclamp the electrode for removal from the holder. Another conventional method has been a threaded connection between the holder and electrode, which of course requires machining of all electrodes to provide the thread. A third construction has made use of a shallow taper between the electrode and holder by means of which the electrode was held in place by frictional locking. This however makes it quite difficult to dislodge the electrode from the holder.

According to the present invention, a one-way detent is mounted on the holder adjacent the bore which receives the electrode. The inner ends of the electrode and holder bore are provided with a taper which is sufficiently sharp to prevent a frictional locking effect from being created when force is applied, but still insures satisfactory electrical contact between the electrode and holder. The disposition of the detent with respect to the outer electrode surface is such that the electrode may be easily inserted in the holder bore. Upon completion of the weld, however, lifting of the holder away from the work will cause the detent to engage the electrode so as to pull the electrode away from the work.

In one form of the invention, the detent comprises a spring-urged ball in an inclined guide passage, the ball engaging a recess in the electrode surface having an inclination slightly different than the inclination of the guide passage. In another form of the invention, the detent comprises a leaf spring inclined toward the inner end of the electrode and engageable with the surface thereof. In a third embodiment of the invention, the detent comprises an annular helical spring engageable with an inclined guide surface on the holder and a surface on the electrode with a slightly different inclination. In all embodiments of the invention, the electrode may be easily removed from the holder by prying the detent away from the electrode surface.

Referring more particularly to the drawings, the electrode holder is generally indicated at 11 and comprises an elongated body of general cylindrical shape having a mounting portion 12 extending from one end thereof. Mounting portion 12 is split, having a plurality of axially extending slots 13, as seen in FIGURE 2, and is provided with a recess 14 for the reception of an actuating member shown in dot-dash lines at 15, which may be part of a welding gun (not shown) or other supporting means capable of applying an axial force to holder 11. Electrical insulating means 16 may be provided between actuating member 15 and recess 14. A C-shaped clamp 17 surrounds body mounting portion 12 and is adapted to secure it to actuating member 15. A pair of extensions 18 are formed on opposite sides of the split portion 19 of clamp 17, a clamping screw 21 extending through these extensions for tightening the clamp.

The other end of holder 11 is provided with an electrode retaining portion 22 having a cylindrical bore 23 therein for the reception of an electrode 24. The electrode has approximately the diameter of bore 23, and a recess 25 is provided at an intermediate portion of bore 23 for the reception of a seal 26, the seal engaging the outer cylindrical surface of electrode 24 and preventing leakage of coolant carried by the electrode. Conventionally, electrode 24 has a central axially extending bore 27, and a coolant conducting tube 28 of smaller diameter than bore 27 is mounted within holder 11 and extends centrally through bore 23, being received by electrode bore 27 when the electrode is mounted in the holder. A hollow adapter 29 is threadably mounted within holder 11 and supports tube 28. Two pairs of coolant conducting ports 31, 32, and 33, 34 are provided on opposite sides of holder 11, as seen in FIGS. 1 and 2. One port of each pair of ports is connected with the upper end of adapter 29 while the other port is connected to a chamber 35 within holder 11 which connects with the inner end of electrode bore 27. The two pairs of coolant ports may be used alternatively, depending upon the installation requirements. An extension 36 is formed on holder 11 for ports 33 and 34 and is adapted to have an electrical cable (shown in dot-dash lines at 36a) secured thereto.

The inner end 37 of electrode 24 is provided with a taper, a complementary taper 38 formed at the inner end of holder bore 23. The angularity of this taper is of such magnitude that frictional locking of electrode 24 within holder 11 will be avoided, while at the same time good electrical contact will be created between the holder and electrode when an axial force is applied on the holder by actuating member 15. Although the tapered surfaces are shown as being continuous in the illustrated embodiment of the invention, it is contemplated that fluted surface could be provided within the principles of the invention for conducting coolant, if a coolant circulation system other than that illustrated is used.

The means for locking electrode 24 to holder 11 upon withdrawal of the holder from a workpiece 39 engaged by electrode 24 comprises a detent 41 carried by holder 11 and engageable with the outer surface of electrode 24. In the embodiment of the invention illustrated in FIGS. 1 to 3, detent 41 is in the form of spherical element or ball, and is disposed within a cylindrical guide passage 42 formed in an extension 43 at the outer end of holder portion 22. Guide passage 42 is inclined from the vertical, a suitable angle being about 20°. A helical compression spring 44 is disposed within passage 42 and a plug 45 is threadably secured in the upper end of extension 43 and supports one end of spring 44, the other end engaging ball 41.

Guide passage 42 may be formed by a drilling operation and extends a sufficient distance to connect with bore 23, thus permitting detent 41 to project partially into this bore without completely entering the bore. Extension 43 has a radially extending portion 46 at the lower end thereof, as seen in FIGURE 3, and this portion has an inner surface 47 which serves to limit outward movement of detent 41. The shape of the connection between passage 42 and bore 27 is such that detent 41 cannot be inadvertently dislodged from guide passage 42.

A recess 48 is provided on the surface of electrode 24, the position of this recess being such that it will be opposite the connection of guide passage 42 with bore 23 when electrode 24 is fully inserted into bore 23. The lower portion of recess 48 is of concave shape, and the recess is of sufficient depth to permit reception of a substantial portion of detent 41. An inclined wall 49 forms the upper portion of recess 48. Surface 49 is inclined from the vertical by a slightly lesser angle than is passage 42. For example, if passage 42 is inclined 20° from the vertical, surface 49 may be inclined about 15°. The construction is such that when detent 41 is wedged between passage 42 and surface 49 by spring 44, upward movement of holder 11 will frictionally wedge detent 41 against surface 49, thus causing an upward force to be exerted on electrode 24.

The exact depth of recess 48 is not critical, in that the parts could function properly if detent 41 engaged limit surface 47 when electrode 24 were fully inserted in holder 11, but did not engage surface 49 at this time. If this were the case, upward movement of holder 11 would result in slight upward movement of the holder with respect to the stuck electrode 24, until detent 41 engaged surface 49. Continued upward movement of holder 11 would then pull electrode 24 away from the work.

As mentioned above, a relatively angularity exists between guide passage 42 and electrode surface 49. This angularity is indicated at A in FIGURE 3, and should be sufficiently small as to prevent slipping of detent 41 with respect to surface 49 when holder 11 is pulled upwardly. Means for releasing detent 41 from electrode surface 49 is provided in the form of an access hole 50 in lower portion 46 of extension 43. By pushing upwardly on the exposed lower end of a headed pin 51 in hole 50, or by inserting a rod or similar tool if pin 51 is not provided, detent 41 may be pried loose from surface 49 and pushed up unto guide passage 42 a distance sufficient to retract detent 41 from bore 23, thus permitting removal of electrode 24.

In operation, electrode 24 will be inserted in bore 23, the tapered upper end 37 of the electrode pushing aside detent 41 as the electrode is inserted. When the electrode is fully inserted, detent 41 will snap into position within recess 48. Relative rotational movement between the electrode and holder will be prevented by the disposition of detent 41 within recess 48. Depending upon the depth of recess 48, detent 41 will either be wedged by spring 44 between surface 49 and guide passage 42, or will rest on limit surface 47.

When force is applied by actuating member 15 to holder 11, tapered portions 37 and 38 of the electrode and holder respectively will insure adequate electrical contact between these elements. The force will be transmitted to the tip of electrode 24 and thus to work 39.

After the welding current has been shut off, holder 11 will be withdrawn upwardly by actuating member 15. Electrode 24 will tend to stick to work 39. However, detent 41 will engage surface 49 of recess 48 and will pull electrode 24 away from the work.

When it is desired to remove electrode 24, upward finger pressure may be exerted on release pin 51 and detent 41 forced upwardly into guide passage 42, being retracted from recess 48 and permitting electrode 24 to be withdrawn from bore 23. The non-locking configuration of tapered portions 37 and 38 will not interfere with easy removal of electrode 24.

FIGURE 4 shows another embodiment of the detent means, the detent being indicated at 101 and comprising a leaf spring having one end 102 secured to an extension 103 on the holder, similar to extension 43, and the other end engageable with electrode 104. The outer surface of electrode 104 may be of uninterrupted cylindrical shape when used with detent 101. The detent is disposed within a recess 105 in extension 103 which permits flexure of spring 101. The length of the spring is such that it projects slightly into bore 106 of the holder, and upward insertion of electrode 104 will flex detent 101 upwardly, as seen in FIGURE 4. Upon an upward pull being exerted on the holder, and particularly extension 103 thereof, spring 101 will be wedged against electrode 104, thus exerting a frictional force on electrode 104 in an upward axial direction and pulling the electrode away from the workpiece. As in the previous embodiment, an access hole 107 may be provided in extension 103 for prying detent 101 away from electrode 104, thus allowing the electrode to be easily removed.

FIGURE 5 shows a third form of the detent, indicated at 201. In this form, the detent comprises an annular helical spring and is disposed within an annular recess 202 in the lower end of holder 203, adjacent the outer end of bore 204 which receives electrode 205. Recess 202 has a horizontal inner surface and an inclined surface 206 extending outwardly therefrom. An annular recess 207 is provided in electrode 205, the main portion of recess 207 having a surface inclined from the vertical by a slightly lesser angle than is surface 206. Surfaces 206 and 207 are thus analogous, as far as the detent wedging action is concerned, to guide passage 42 and surface 49 in the embodiment of FIGURES 1 to 3. A plurality of circumferentially spaced access holes 208 are provided in the bottom of holder 203 so that detent 201 may be pried loose from surface 207 when it is desired to withdraw holder 205 from bore 204.

In operation of the embodiment of FIGURE 5, detent 201 will be moved from its solid line or unstressed position to its dot-dash line position when electrode 205 is being inserted in bore 204. When electrode 205 is fully inserted in the holder, recess 207 will become aligned with recess 202, and spring 201 will contract and will wedge itself between surfaces 206 and 207. Upward movement of holder 203 after the weld is completed will cause detent 201 to be wedged against surface 207, thus exerting an upward axial force on electrode 205.

To remove electrode 205, rods or similar elements could be simultaneously inserted in all of the circumferentially spaced access holes 208, thus prying detent 201 loose from surface 207. For this purpose, an annular tool (not shown) could be provided carrying a plurality of circumferentially spaced rods for insertion into holes 208.

Means such as a key or spline construction could be provided in the embodiments of FIGURES 4 and 5 for preventing undesired rotation of the electrode within the holder bore.

It will thus be seen that a novel and improved electrode holder has been provided which avoids a costly construction for pulling away a stuck electrode from the work, and at the same time insures a high current flow and makes it extremely easy to remove the electrode when required.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In combination, an electrode holder having an electrode retaining bore, an electrode inserted within said bore, the inner ends of said bore and electrode having complementary surfaces of sufficient inclination to prevent frictional locking of the electrode to the holder when an axial force is exerted by the holder on the electrode, a detent disposed within a recess on said electrode holder which opens to said bore and having smaller dimensions than said recess so as to be movably carried by said electrode holder, said detent being movable between a retracted position and electrode-engaging position in which the detent is urged into said bore, urging means for said detent, the detent being normally urged by said urging means toward its electrode-engaging position but being movable by the electrode to its retracted position in response to insertion of the electrode into said bore, and means responsive to a force exerted on said holder in a direction axially away from said electrode for causing said detent to frictionally engage said electrode and exert an axial force thereon in the same direction.

2. The combination according to claim 1, further provided with at least one access hole in said holder so disposed relative to said detent as to open toward the detent when the latter is in its electrode-engaging position and permit said detent to be pried loose from said frictional engagement with the electrode, whereby said electrode may be withdrawn from the holder.

3. In combination, an electrode having a cylindrical main surface and a tapered inner end inserted in an electrode holder having a cylindrical electrode-receiving bore and a tapered portion at the inner end of said bore complementary to said electrode taper, the inclination of said tapers being such as to prevent frictional locking engagement of the electrode and holder when an axial force is exerted on the electrode by the holder, a detent retaining recess in said electrode holder connecting with said bore and inclined from the electrode axis, a detent having smaller dimensions than said recess so as to be movably mounted in said recess and movable between a retracted position and an electrode-engaging position partially disposed within said bore, an electrode recess on said cylindrical electrode surface, said electrode recess being aligned with that portion of the detent retaining recess connected with said bore when said electrode is fully inserted in said holder bore, whereby said detent may enter said electrode recess, and a surface forming part of said electrode recess inclined from the axis of said electrode a slightly lesser angle than the angle of inclination of said detent retaining recess, whereby an axial force exerted on said electrode holder away from said electrode will cause said detent to be wedged against said inclined electrode recess surface, thus causing a force to be exerted on said electrode in the same direction as the last-mentioned force exerted on said holder.

4. The combination according to claim 3, said detent retaining recess comprising a cylindrical guide passage in said holder, said detent comprising a spherical member, and a spring in said guide passage urging said spherical member toward its electrode-engaging position.

5. The combination according to claim 3, said detent retaining recess comprising an annular groove, said detent comprising an annular helical spring engageable with said electrode along its entire circumferential length, said electrode recess also being of annular shape.

6. In combination, an electrode having a cylindrical main surface and a tapered inner end, an electrode holder having a cylindrical electrode-receiving bore with an inner end having a taper complementary to that of said electrode, the inclination of said tapers being such as to prevent frictional locking of said electrode to said holder upon the exertion of an axial force by said holder on said electrode, a recess in said holder connected with said bore, a leaf spring having one end secured to the inner end of said recess, the length of said leaf spring being such that when unrestrained it will project a slight distance into said bore, the spring being deflectable in response to insertion of said electrode into said bore, the exertion of a force on said holder away from said electrode causing said leaf spring to be frictionally wedged against the cylindrical main surface of said electrode so as to exert a force in the same direction on the electrode, and an access hole for permitting said leaf spring to be pried away from said electrode, whereby the electrode may be withdrawn from said bore.

7. In combination, an electrode holder having an electrode retaining bore, an electrode inserted within said bore, the inner ends of said bore and electrode having complementary surfaces of sufficient inclination to prevent frictional locking of the electrode to the holder when an axial force is exerted by the holder on the electrode, coolant circulation passages in said holder connected with said bore, means on the end of said electrode opposite said bore for securing the electrode holder to an actuating member, a detent disposed within a recess on said electrode holder which opens to said bore and having smaller dimensions than said recess so as to be movably carried by said electrode holder, said detent being movable between a retracted position and electrode-engaging position in which the detent is urged into said bore, the detent being normally urged toward its electrode-engaging position but being movable by the electrode to its retracted position in response to insertion of the electrode into said bore, and means responsive to a force exerted on said holder in a direction axially away from said electrode for causing said detent to frictionally engage said electrode and exert an axial force thereon in the same direction.

8. The combination according to claim 7, further provided with a release pin slidably mounted in said electrode holder and manually movable into engagement with said detent to move the detent to its retracted position.

References Cited in the file of this patent
UNITED STATES PATENTS

| | | |
|---|---|---|
| 1,814,274 | Williamson | July 14, 1931 |
| 2,160,676 | Richard | May 30, 1939 |
| 2,437,740 | Haynes | Mar. 16, 1948 |
| 2,470,603 | Coulter et al. | May 17, 1949 |
| 2,767,990 | Jewell | Oct. 23, 1956 |
| 2,829,239 | Boretti | Apr. 1, 1958 |